INVENTOR.
ARTHUR J. NELSON
BY Naylor + Neal
ATTORNEYS

United States Patent Office 3,438,462
Patented Apr. 15, 1969

3,438,462
INCREASED CAPACITY THRUST BEARING ASSEMBLY
Arthur J. Nelson, 1998 Broadway,
San Francisco, Calif. 94109
Filed Dec. 29, 1966, Ser. No. 605,758
Int. Cl. F01m *1/00;* F16n *17/06, 29/00*
U.S. Cl. 184—6                                    12 Claims

ABSTRACT OF THE DISCLOSURE

A thrust bearing assembly of the collar and ring type for use in combination with a planetary gear train. The assembly is designed for coaxial incorporation into a planetary gear train so that both the collar and ring journals thereof are independently driven by the elements of the train to establish a relative velocity therebetween exceeding that which would occur if one of the journals were stationary.

---

The present invention relates to an improved thrust bearing assembly for use in combination with a planetary transmission and, more particularly, is directed to such an assembly ideally suited for use in submergible apparatus of the type disclosed in my copending application Ser. No. 570,197, filed Aug. 4, 1966. The invention is especially concerned with a gear train and thrust bearing combination wherein radial loads are substantially eliminated and the capacity of the thrust bearing is greatly increased relative to the capacity of similar bearings in conventional combinations.

Where heavy severe thrust loads are imparted to driven shafts, such as the loads which may occur in rock crushing apparatus of the type disclosed in my copending application Ser. No. 533,623, filed Mar. 11, 1966, it is desirable to use collar and ring thrust bearings of the Kingsbury type. Such bearings are characterized in that they are well facilitated to withstand severe impact type loads without damage. These bearings are also characterized, however, in that their load capacity diminishes with decreases in the relative velocity between the mating journal elements thereof. Thus, where these bearings are employed for low speed driven shafts, with one journal element fixed and the other mounted on the driven shaft for rotation therewith, they must be of relatively large size. As a result, the employment of such bearings in confined environments of the type suggested in my aforementioned applications presents a problem with respect to size accommodation. Naturally, the employment of bearings of large physical dimension also is a disadvantage from a cost standpoint.

It is, accordingly, a principal object of the present invention to provide a thrust bearing assembly of the collar and ring type which avoids the problems of size accommodation and cost incumbent with collar and ring type bearing assemblies, and particularly those of the Kingsbury type, employed for the support of slow speed driven shafts.

With respect to the latter object, it is another and more specific object of the invention to provide an improved thrust bearing assembly for use in combination with a planetary gear train to effect the support of a shaft driven by the train.

Another object of the invention is to provide a thrust bearing assembly designed for symmetric incorporation into a planetary gear train.

Yet a further object of the invention is to provide a thrust bearing assembly in a transmission combination wherein radial loads are substantially balanced.

Another object of the invention is to provide a thrust bearing assembly of the collar and ring type for use in combination with a planetary gear train which incorporates an improved lubrication system.

The specifics of the invention and the foregoing and other objects will become more apparent when viewed in light of the accompanying drawings, wherein.

Figures 1, 2:
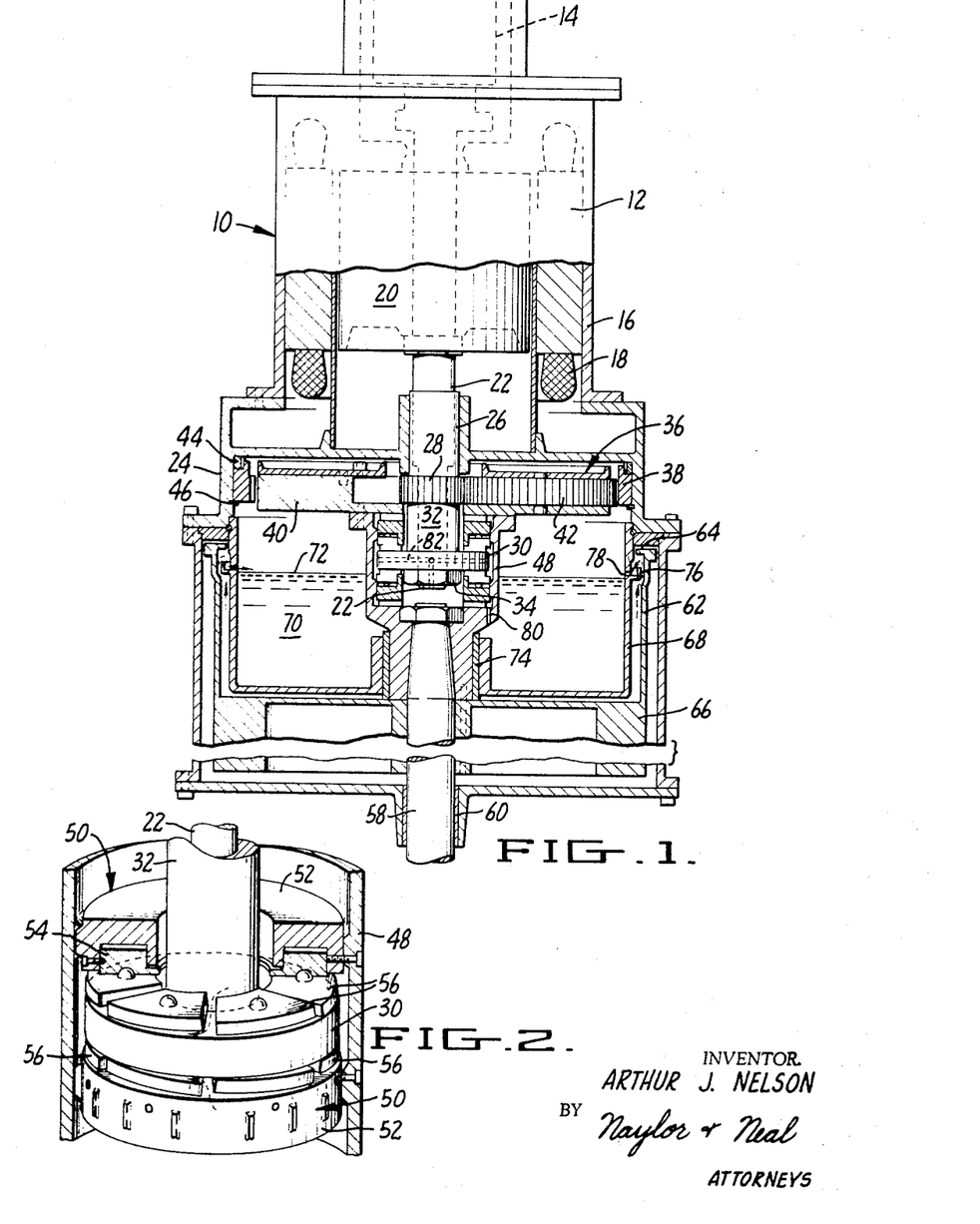
FIG. 1 is an elevational view, partially in section, illustrating one embodiment of the assembly employed in combination with a single stage speed reducing planetary gear train.
FIG. 2 is a partial perspective view, in section, illustrating the Kingsubry bearing of the assembly shown in FIG. 1.

Referring now specifically to FIG. 1, the motor and transmission unit illustrated therein is designated in its entirely by the numeral 10. This unit includes at the upper end thereof an electric motor 12 and a primary thrust bearing 14. The thrust bearing 14 corresponds substantially to the upper thrust bearing used in combination with the motor in my aforementioned copending application Ser. No. 570,197. The motor 12 is completely enclosed in a housing 16 and includes a stator 18 and rotor 20 of the relatively conventional nature. The rotor 20 drives a driver shaft 22 fixed thereto and extending axially therethrough.

The transmission of the unit 10 is disposed beneath the motor 12 and confined within a housing 24 sealingly secured to the housing 16. The driver shaft 22 extends into the housing 24 through means of a radial sleeve bearing 26 disposed in supporting engagement therewith. Beneath the bearing 26, the shaft 22 has fixed thereto in spaced relationship a planetary sun pinion 28 and a Kingsbury thrust collar 30. The pinion and collar are maintained in spaced relationship by sleeve 32 interposed therebetween and receive around the shaft 22. A nut 34 threadably received on the lower end of the shaft 22 secures the pinion 28, collar 30 and sleeve 32 against axial movement relative to the shaft 22.

The sun pinion or gear element 28 forms part of a single stage planetary gear train comprised, additionally, of a planet cage assembly 36 and a ring gear 38. The planet cage assembly 36 is comprised of a cage 40 coaxially received around the pinion 28 and a plurality of planet pinions 42 (only one of which is illustrated) rotatably supported on the cage in engagement with the pinion 28 and ring gear 38. The ring gear 38 is secured to the housing 24 against rotational movement relative thereto by an annular spline 44 and snap ring 46. The snap ring and spline engagement of the ring gear 38 with the housing 24 permits the ring gear to move through a limited rectilinear path relative to the housing so that it may assume aligned engagement with the pinions 42.

The cage assembly 36 is supported on an annular support fixture 48 fixed to the cage 40 and extending around the collar 30 for rotation relative thereto. The support fixture 48 has secured therein on opposite sides of the collar 30 a pair of Kingsbury thrust shoe assemblies 50. These assemblies comprise the ring journals of the bearing and are of conventional construction and each comprise: a base ring 52; a leveling plate 54; and, a plurality of shoes 56 rockably mounted on the plate 54. In operation, the thrust shoe assemblies 50 function to transmit thrust loads from the fixture 48 to the collar 30. During this operation, as is diagrammatically illustrated by the dashed arrow lines in FIG. 2, oil flows beneath the shoes 56 to effect rocking thereof and the buildup of an oil cushion between the opposed surfaces on the shoes and the collar 30. Thrust forces tranmitted to the collar 30 are, in turn, transmitted to the primary thrust bearing 14 through the shaft 22.

The lower end of the fixture 48 is fixed to a driven shaft 58 extenidng axially therefrom through a radial sleeve bearing 60 therefor in the housing 24. The shaft 58 has fixed in concentric relationship thereto for rotation therewith a cup 62. The cup 62 defines an annular chamber having an inwardly extending annular collar 64 around its upper peripheral edge. The lower end of the cup 62 has formed integrally therewith a flywheel 66.

An oil reservoir 68 of annular configuration is fixed to the housing 24 and extends therefrom downwardly into the cup 62. The reservoir 68 surrounds the fixture 48 and contains therein oil 70 to a predetermined level 72 beneath the upper extremity of the cup 62 defined by the collar 64. The reservoir 68 has mounted centrally thereof a radial sleeve bearing 74 mated in engagement with the outer lower surface of the fixture 48. The reservoir 68 also includes an annular collection flange 76 extending outwardly therefrom beneath the collar 64. Orifices 78 disposed within the confines of the flange 76 establish fluid communication between the interior of the cup 62 and the interior of the reservoir 68. The orifices 78 are located at a level between the upper extremity of the cup 62 defined by the collar 64 and the level 72 of the oil 70.

In operation of the FIG. 1 embodiment, the planetary gear train functions to impart rotation from the shaft 22 to the shaft 58 at a reduced speed. During this operation, the thrust collar 30 is rotated with the shaft 22 and the thrust shoe assemblies 50 are rotated, in the same direction, wtih the shaft 58. Thus, as contrasted to the conventional Kingsbury mounting arrangement, with the arrangement of FIG. 1 both the thrust collar and the shoe assemblies rotate. Since these bearing components rotate at different speeds, however, whenever the gear ratio of the planetary gear train is designed to effect a speed reduction of greater than two to one, the speed differential between the collar 30 and the bearing assemblies 50 is greater than that which would occur if one of these bearing components were fixed against rotation in conventional manner. As a result, the load capacity of the Kingsbury bearing for the low speed shaft 58 is increased over that which would occur with conventional bearing mounting arrangements.

Lubrication of the low speed Kingsbury bearing in the FIG. 1 embodiment is provided through means of orifices 80 (only one of which is illustrated) extending in fluid communication between the interior of the reservoir 68 and the interior of the fixture 48. Through these orifices, oil continuously enters the fixture 48 and flows between the bearing surfaces of the collar 30 and the shoes 56. The flow of oil is enhanced through means of oil passages 82 leading from the lower end of the shaft 22 to the outer periphery of the collar 30. Through these passages, oil is centrifugally thrown outwardly by rotational movement of the collar 30. During operation of the FIG. 1 lubricating system, any oil which escapes past the sleeve bearing 74 is captured in the cup 62 and thrown centrifugaly against the outer peripheral wall thereof in vortex like fashion. Upon movement of this oil upwardly along the outer wall of the cup 62, it is deflected downwardly by the collar 64 into the collection flange 76 of the reservoir 68. From the flange 76, the oil is returned to the interior of the reservoir 68 through the orifices 78. Thus, the escape of oil from the lubrication system for the low speed thrust bearing is prevented. Furthermore, the flow of oil in the cup 62 effects the cooling thereof.

Figure 3:
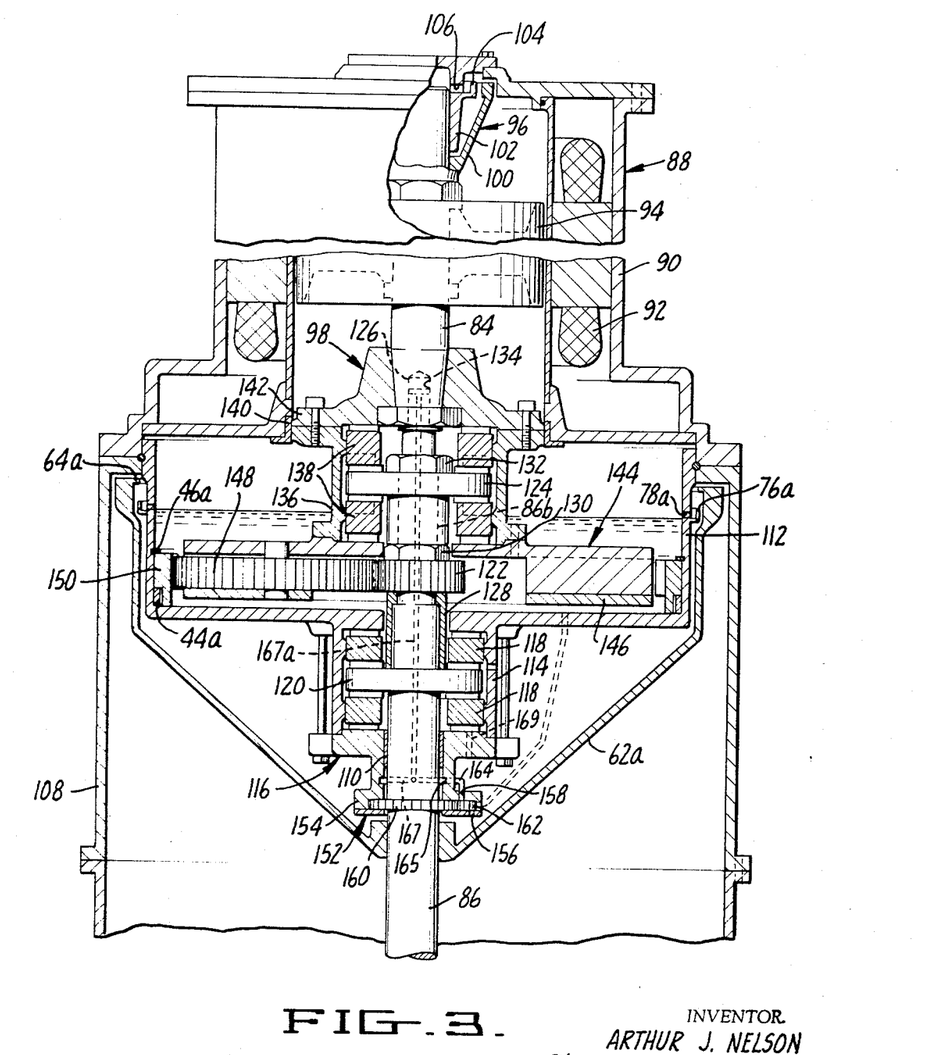
FIG. 3 is an elevational view, partially in section, illustrating a second embodiment of the assembly employed in combination with a single stage speed increasing planetary gear train.

Referring now to FIG. 3, the embodiment of the invention therein illustrated is designed to effect a speed increase from a driver shaft 84 to a driven shaft 86. The driver shaft 84 is driven by an electric motor 88 confined within a housing 90. The motor 88 includes a fixed stator 92 mounted within the housing 90 and a rotor 94 keyed to the driver shaft 84 to effect rotation thereof. Rotatable support of the shaft 84 and rotor 94 within the housing 90 is provided by radial sleeve bearing assembly 96 mounted in the upper end of the housing and a Kingsbury thrust bearing assembly 98. The sleeve bearing assembly 96 is of the centrifugal flow type and comprises: a cup 100 fixed to and extending around the shaft 84 for rotation therewith; a bearing collar fixed to the housing 90 in supporting relationship with the shaft 84; a collection flange 104 fixed to and extending annularly around the bearing 102; and, a plurality of orifices 106 establishing fluid communication between the interior of the flange 104 and the upper extremity of the mating bearing surfaces between the shaft 84 and the bearing 102. In operation of the sleeve bearing assembly 96, oil continuously flows over the bearing surfaces between the shaft 84 and the bearing 104 and over the interior surface of the cup 100 into the flange 104. Movement of oil in the cup 100 is effected by centrifugal vortex action which results from rotation of the cup with the shaft 84. The structure and operation of the bearing assembly 98 is developed in the subsequent description.

The housing 90 is fixedly and sealingly secured at the lower end thereof to a housing 108 in which the thrust bearing and transmission structure of the FIG. 3 embodiment is enclosed. The housing 108 is shown as being part of the driven apparatus below the motor and provides a connecting chamber between this apparatus and the motor housing 90. The housing 108 also has fixedly mounted therein an annular oil reservoir 112 through which the driven shaft 86 rotatably extends. A support fixture 114 for a Kingsbury thrust bearing assembly 116 is fixed to and depends downwardly from the reservoir 112. The fixture 114 has mounted therein a pair of thrust shoe assemblies 118 corresponding in structure and operation to the aforedescribed assemblies 50. The thrust shoe assemblies 118 rotatably support a Kingsbury thrust collar 120 fixed to the driven shaft 86 for rotation therewith.

The driven shaft 86 extends upwardly from the collar 120 and has fixedly supported thereon for rotation therewith: a sun pinion 122; a Kingsbury thrust collar 124; and, a radial bearing extension 126. The pinion 122 is held in place between a sleeve 128 juxtaposed against the collar 120 and a nut 130 threadably received on the shaft 86. The collar 124 is held in place between a portion 86b of the shaft 86 having a reduced diameter and a nut 132 threadably received on the shaft. The bearing extension 126 is fixed to the shaft 86 and extends axially therefrom into rotatable bearing engagement with a socket 134 formed in the lower end of the driver shaft 84. Lower radial support of the shaft 86 is provided by a journal 110 mounted in the lower portion of the fixture 114.

The driver shaft 84 has fixedly secured thereto an annular support fixture 136 for the Kingsbury thrust shoe assemblies cooperating with the thrust collar 124. The latter assemblies, designated by the numerals 138, are mounted within the fixture 136 and operate in a manner corresponding to the aforedescribed assemblies 50. Radial support is imparted to the fixture 136 by a sleeve bearing 140 fixedly mounted between the housings 90 and 108 in rotational bearing engagement with an annular bearing portion 142 on the fixture. The lower end of the fixture 136 has fixed thereto a planet cage assembly 144 forming part of the planetary gear train cooperating with the sun pinion 122. The assembly 144 comprises a cage 146 and a plurality of planet pinions 148 (only one of which is illustrated). The pinions 148 are supported in engagement with the sun pinion 122 and a ring gear 150 mounted in the fixed reservoir 112. The mounting of the ring gear 150 in the reservoir 112 corresponds to that of the aforedescribed ring gear 38 and includes a spline 44a and a snap ring 46a corresponding to the elements 44 and 46, respectively, of the FIG. 1 embodiment. Through the latter provision, the ring gear 150 is locked against rotation relative to the reservoir 112 while being free for limited rectilinear movement relative thereto.

In operation, rotational movement of the relatively low speed driver shaft 84 is imparted to the high speed driven shaft 86, in the same direction, through the planetary gear train. The driven shaft is rotatably supported through the collar 120 on the fixed support fixture 114. The driven shaft, in turn, supports the driver shaft 84 through means of the rotatably mounted support fixture 36 and the thrust collar 124. Both of the latter elements are mounted for rotation, and, thus, function in much the same manner as the elements 30 and 48 of the FIG. 1 embodiment. Specifically, where the differential in speed between the driven shaft 86 and the driver shaft 84 is greater than two to one, the load capacity of the bearing assembly comprised of the collar 124 and fixture 136 is greater than the capacity the assembly would have if the collar 124 were fixed.

Lubrication of the FIG. 3 embodiment is effected through a system corresponding substantially to that employed with the FIG. 1 embodiment. In this system, the reservoir 112 functions in much the same manner as the aforedescribed reservoir 68. The reservoir 112 has cooperating therewith a collection flange 76a and orifices 78a corresponding in structure and operation to the flange 76 and orifices 78, respectively. The lubrication system in FIG. 3 further comprises a cup 62a, corresponding to the cup 62, fixed to and extending around the driven shaft 86 for rotation therewith. The cup 62a includes an upper extremity defined by a collar 64a corresponding in structure and operation to the collar 64.

In operation, the lubrication system of the FIG. 3 embodiment functions similarly to that of FIG. 1 in that a vortex action is created in the cup 62a during its rotation to effect the flow of oil radially of the cup and into the flange 76a. The operation of the FIG. 3 lubrication system differs from that of FIG. 1 in that the system further includes a gear pump 152 to effect the circulation of oil from the lower extremity of the reservoir 112 to the wearing parts. The gear pump 152 comprises: a housing 154 fixed to the fixture 114 and extending downwardly therefrom around the driven shaft 86, said housing having an inlet port 156 and an outlet port 158 therein; a drive pinion 160 concentrically fixed to the shaft 86 for rotation within a cavity provided therefor in the housing 154; an idler pinion 162 mounted within a cavity provided therefor in the housing 154 for rotation by the drive pinion 160; and, a conduit 164 directing oil from the outlet port 158 to a system of drilled holes 165 in the driven shaft 86. During rotation of the driven shaft 86, the gear pump 152 operates to draw oil into the inlet port 156 and discharge it from the outlet port 158, under pressure. From the outlet port 158, oil is discharged through the conduit 164 into an annular groove 165 surrounding the shaft 86. Oil entering the groove 165 is communicated to holes 167 communicate with a passage 167a extending axially through the shaft 86 and discharging therefrom into the socket 134. Thus, oil from the pump 152 is discharged under pressure to the socket 134. From the socket 134 the oil drops, under the influence of gravity, through the bearing assembly 98, the reservoir 112 and the bearing assembly 116. From the assembly 116, oil returns to the cup 62a through an orifice in the fixture 114.

Figure 4:
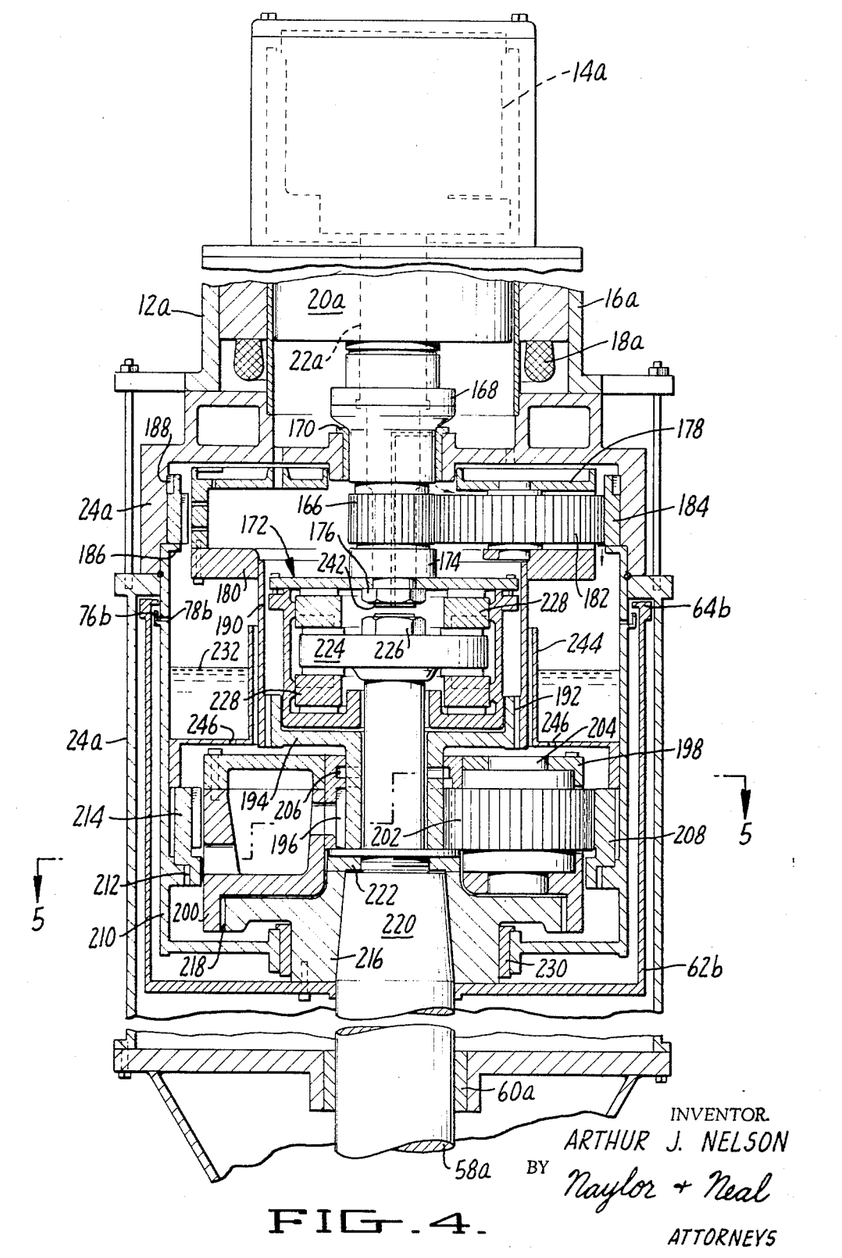
FIG. 4 is an elevational view, partially in section, illustrating a third embodiment of the assembly employed in combination with a two stage speed reducing planetary gear train.
Figure 5:
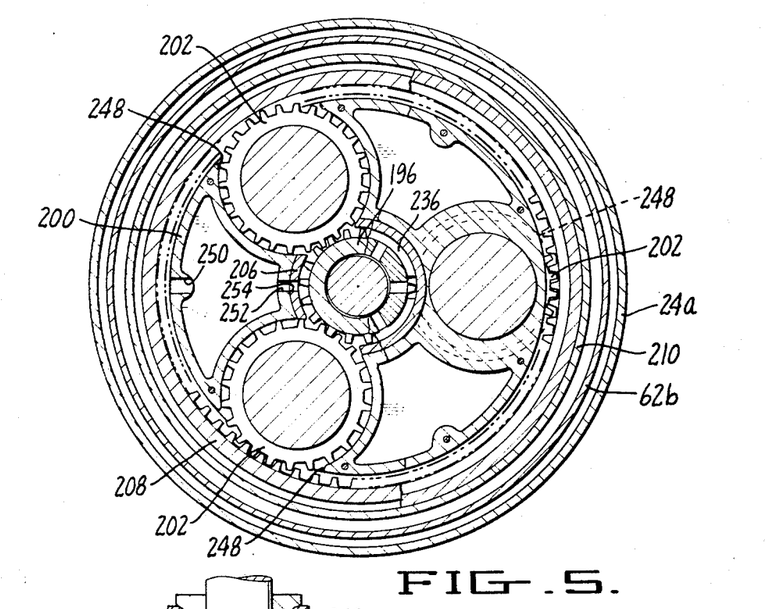
FIG. 5 is a sectional view taken on the plane designated by line 5—5 in FIG. 4.

Referring now to FIG. 4, the embodiment of the invention therein illustrated is provided with driving and primary thrust bearing structure corresponding substantially to that of the FIG. 1 embodiment. For the sake of simplicity, the elements of this structure are designated by numbers corresponding to those of the FIG. 1 embodiment, followed by the subscript a, as follows: electric motor 12a; primary thrust bearing 14a; motor housing 16a; stator 18a; rotor 20a; and, driver shaft 22a. The housing 16a has sealingly secured therebelow a housing 24a corresponding substantially to the housing 24. The housing 24a mounts the radial sleeve bearing 60a, corresponding substantially to the bearing 60, for radial support of a driven shaft 58a corresponding substantially to the shaft 58.

The driver shaft 22a is coupled in driving engagement with a primary sun pinion 166 by coupling 168. The coupling 168 is radially supported within the housing 24a by a sleeve bearing 170 mounted therein. A thrust bearing support fixture 172 is also secured in driving engagement with the shaft 22a through means of a connector 174 secured for rotation with the pinion 166 by a nut 176. As a result of the latter arrangement, the support fixture 172 is directly driven by the shaft 22a for rotation therewith.

A primary planet cage assembly 178 is coaxially received around the sun pinion 166 for rotation relative thereto. The assembly 178 comprises a cage 180 rotatably supporting a plurality of primary planet pinions 182 (only one of which is illustrated) in engagement with the sun pinion 166. The planet pinion 182 also engage a primary ring gear 184 mounted on the housing 24a against rotational movement relative thereto. The ring gear 184 is supported in the housing 24a for limited rectilinear movement relative thereto between a shoulder 186 and a spline 188. Thus, a ring gear 184 is free to move rectilinearly over a limited path to facilitate its aligned engagement with the planet pinions 182.

Figure 6:
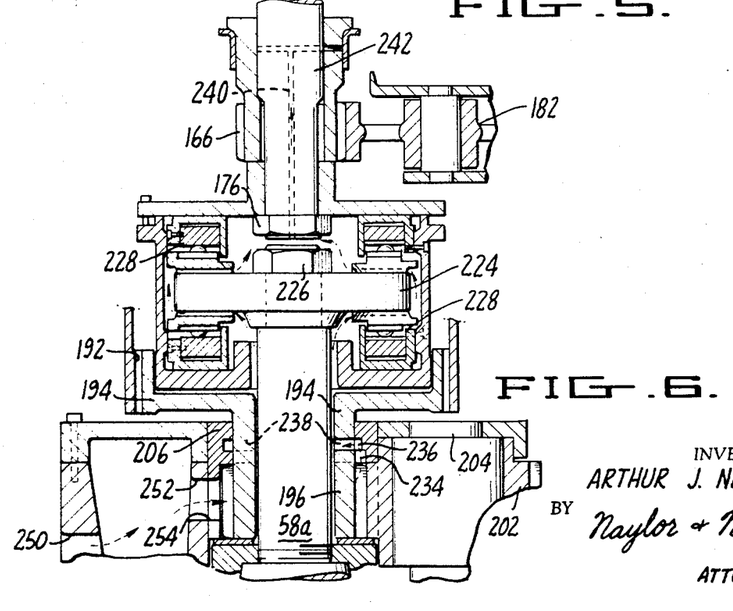
FIG. 6 is a partial sectional elevational view of the third embodiment illustrated in FIG. 4, diagrammatically illustrating the lubricant flow therethrough.

The cage 180 has a sleeve 190 fixed in coaxial alignment therewith and extending therefrom around the support fixture 172. The lower end of the sleeve 190 is provided with an internal spline 192 mated in driving engagement with an extension 194 on a secondary sun pinion 196. The secondary sun pinion 196 has a secondary planet cage assembly 198 concentrically received therearound for rotation relative thereto. The cage assembly 198 comprises: a cage 200; a plurality of secondary planet pinions 202 rotatably mounted on the cage in engagement with the sun pinion 196; journals 204 supporting the planet pinions on the cage; and, an oil guide 206 fixed to the cage 200 above the sun pinion 196 for rotation relative thereto. The detailed structure and operation of the oil guide 206 will be developed subsequently in the description of the lubrication system and its operation, as diagrammatically illustrated in FIG. 6. The secondary planet pinions 202 mate in engagement with a secondary ring gear 208 mountet against rotational movement relative to the housing 24a on a reservoir 210 fixed to the housing. The ring gear 208 is mounted on the reservoir 210 for limited rectilinear movement relative thereto between a spline 212 and a shoulder 214. Through this mounting arrangement, the ring gear 208 is free to assume aligned engagement with the pinions 202.

The cage 200 is coupled in driving engagement with the driven shaft 58a by collar 216 fixed to the shaft and extending radially therefrom to a spline connection 218 with the cage. The collar 216 is held on a tapered section 220 on the shaft 58 by a nut 222 threadedly received on the shaft. From the nut 222, the driven shaft 58a extends coaxially through the extension 194 for rotation relative thereto. The upper end of the shaft 58a has a Kingsbury thrust collar 224, corresponding substantially to the collar 30, fixedly secured thereto by a nut 226. The thrust collar 224 is received between thrust shoe assemblies 228 mounted in the support fixture 172 for rotation therewith. The assemblies 228 correspond substantially to the aforedescribed assemblies 50.

Through the aforedescribed planetary gear train arrangement, a double gear reduction is effected between the driver shaft 22a and the driven shaft 58a. Furthermore, the mating thrust collar 224 and thrust shoe assemblies 228 for the driven shaft 58a are driven, respectively, by the shaft 58a and the shaft 22a. As a result, similarly to the arrangement of the FIG. 1 embodiment, whenever the gear reduction from the driver shaft 22a to the driven shaft 58a exceeds two to one, the differential and speed between the mating bearing elements exceed that which would occur if one of the elements were stationary, as is conventional. Thus, the capacity of the thrust bearing assembly for the low speed shaft 58a is increased relative to that of conventional Kingsbury thrust bearing assemblies. It is noted that thrust imparted to the assemblies 228 is transmitted to the primary thrust bearing 14a through the coupling 168 and the driver shaft 22a. The latter bearing is driven at high speed and, thus, has a relatively high load capacity.

The lubrication system for the FIG. 4 embodiment is similar to that of the FIG. 1 embodiment in that it comprises a cup 62b fixed to the driven shaft 58a for rotation therewith. The cup 62b extends upwardly around the fixed reservoir 210 and terminates at its upper extremity in a collar 64b corresponding to the collar 64. The collar 64b is disposed above an annular collection flange 76b on the reservoir 210 corresponding to the flange 76. Orifices 78b, corresponding to the orifices 78, establish fluid communication between the interior of the reservoir 210 and the interior of the cup 62b.

The cup 62b cooperates with a radial sleeve bearing 230 received around the lower portion of the collar 216 to maintain oil within the reservoir 210 to a level depicted by the numeral 232. The bearing 230 is similar to the aforedescribed bearing 74 in that it imparts radial support to the driven shaft. In operation, oil escaping past the bearing 230 is caught in the cup 62b and thrown centrifugally in vortex fashion to the collar 64b. Upon being directed to the collar 64b, oil is deflected into the collection flange 76b and returned to the reservoir 210 through the orifices 78b. Thus, insofar as the action of the cup 62b is concerned, the operation of the FIG. 4 lubrication system corresponds to that of the FIG. 1 system.

The operation of the FIG. 4 lubrication system differs from that of FIG. 1, however, in that it is provided with a positive pressure circuit to direct oil upwardly. Flow in this circuit is diagrammatically illustrated in FIG. 4. Positive pressure is provided to the circuit through the gear pump action of the sun pinion 196 beneath the oil guide 206. Specifically, as can be seen from FIG. 6, oil directed between the teeth of the pinion 196 and the pinions 202 is displaced upwardly through an axial port 234 provided in the guide 206 immediately above the gear 196. From the port 234, the oil passes into annular grooves 236 in the guide 206 which extends around the extension 194. Upon entering the groove 236, the oil is directed through drilled holes 238 in the extension and upwardly around the shaft 58a. After passing around the shaft 58a, the oil flows around the collar 224 and upwardly through a passage 240 provided in a spindle 242 extending between the coupling 168 and the nut 176. It is upon the spindle 242 that the primary sun pinion 166 is mounted. The passage 240 directs the oil to the interface between the coupling 168 and the bearing 170. From this interface, the oil flows downwardly over the pinions 166 and 182 and into the reservoir 210. An annular chamber 244 having an open top and ports 246 in the lower wall thereof catches the oil as it is discharged over the pinions 166 and 182.

It is noted that oil may enter the intermeshing teeth of the pinions 196 and 202 through two routes. Specifically, oil may be directed to these teeth by the teeth of the pinions 202 from openings 248 through which the pinions 202 extend. Furthermore, oil may enter the intermeshing teeth through ports 250 extending through the outer wall of the cage 200 and aligned ports 252 and 254 extending through the inner wall of the cage 200 and the guide 206, respectively. The provision of the ports 250, 252 and 254 is intended simply to increase the capacity of the gear pump provided by the pinion 196. It is to be understood that the pinion 196 would operate satisfactorily as a pump with the omission of the ports 250, 252 and 254. This omission would simply decrease the pumping capacity of the pinion.

Figure 7:
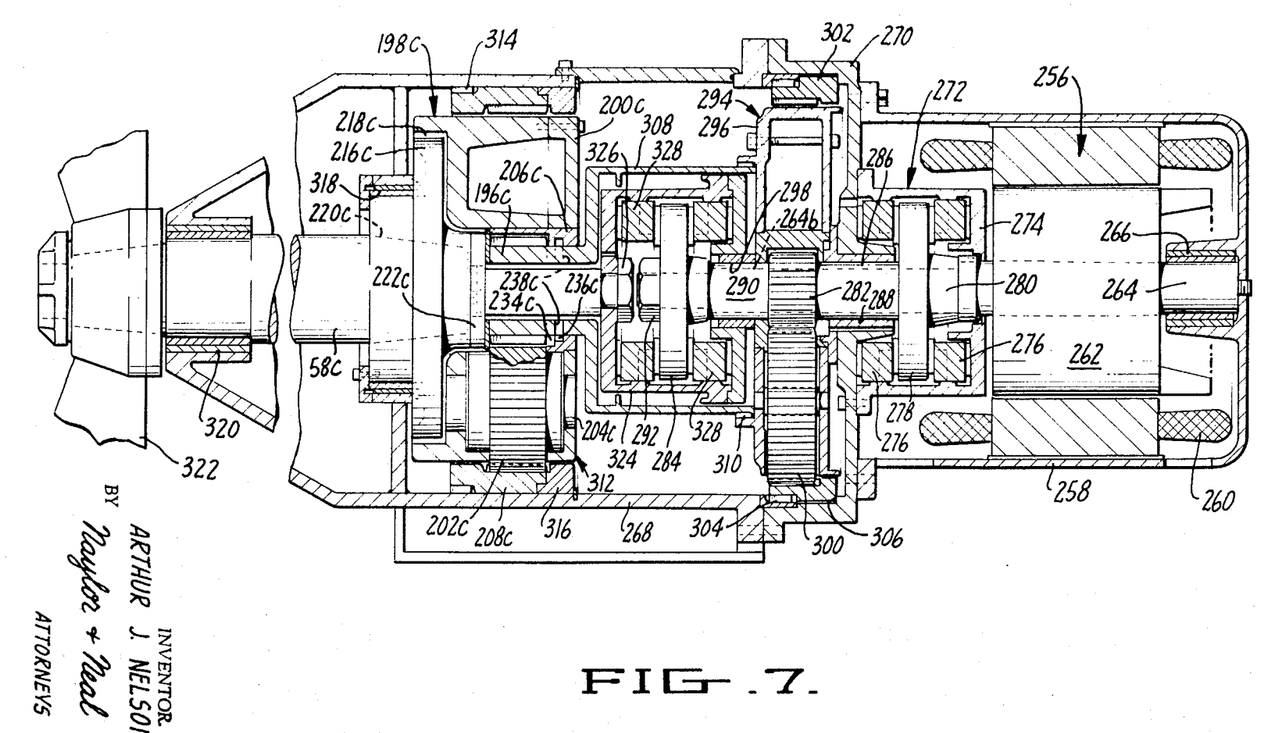
FIG. 7 is an elevational view, partially in section, illustrating a fourth embodiment of the invention employed in combination with a horizontally disposed two stage speed reducing planetary gear train.

Referring now to FIG. 7, the embodiment illustrated therein is similar to that of FIG. 4 in that it incorporates a pair of coupled planetary gear trains to effect a two-stage speed reduction. The FIG. 7 embodiment differs from that of FIG. 4 primarily in that it is designed for horizontal rather than vertical placement. From the subsequent discussion, it will also be seen that the principal thrust bearing assembly in the FIG. 7 embodiment is supported independently of the motor and that the components of the thrust bearing assembly for the driven shaft are reversed, relative to those of the FIG. 4 embodiment.

In FIG. 7, the electric motor is of conventional nature designated in its entirety by the numeral 256. The motor 256 is contained in a housing 258 and comprises: a stator 260 fixed to the housing; a rotor 262 rotatably received within the stator; a driver shaft 264 fixed to and extending axially through the rotor for rotation therewith; and, a sleeve bearing 266 mounted within the housing 258 in engagement with the shaft 264 to effect radial support thereof. The housing 258 is fixed to a transmission housing 268 within which the two-stage planetary gear train of the FIG. 7 embodiment is incased. The housing 268 includes, as part thereof, an upper wall of partition 270 which supports a principal thrust bearing assembly 272 of the Kingsbury type. The assembly 272 directly supports the driver shaft 264 and comprises: a support fixture 274 fixed to the partition 270; a pair of thrust shoe assemblies 276 mounted within the fixture 274; and, a thrust collar 278 fixed to the driver shaft 264 for rotation therewith between the assemblies 276. It is to be understood that in operation the assembly 272 operates in conventional Kingsbury fashion with the assemblies 276 held against rotation and the collar 278 rotating therebetween.

A secondary driver shaft 264b is connected to the shaft 264 for rotation therewith by a coupling 280 supported on the collar 278. From the collar 278, the shaft 264b extends into the housing 268 where it has coaxially fixed thereto a primary sun pinion 282 and a Kingsbury thrust collar 284. A sleeve 286 is fixedly held between the collar 278 and the pinion 282 for rotational movement within a radial sleeve bearing 288 engaged therewith and supported on the partition 270. The pinion 282 and collar 284 are held in spaced relationship by a sleeve 290 interposed therebetween and received around the shaft 264b. A nut 292 is threadably received on the shaft 264b beneath the collar 284 to secure the collar against the sleeve 290.

The sun pinion 282 has coaxially received therearound for rotation relative thereto a primary planet cage assembly 294. The assembly 294 comprises a cage 296 having a bore 298 therethrough rotatably received on the sleeve 290 for radial support thereby; and, a plurality of primary planet pinions 300 (only one of which is illustrated) rotatably supported on the cage 296 in engagement with the sun pinion 282. The planet pinions 300 mate in engagement with a primary ring gear 302 mounted within the housing 268 against rotational movement relative thereto. The ring gear 302 is mounted on the housing 268 for limited rectilinear movement relative thereto between the spline 304 and the shoulder 306. This mounting, similarly to the ring gear mountings in the aforedescribed embodiments, facilitates alignment of the ring gear 302 with the pinions 300.

An extension 308 is secured to the cage 296 in axial alignment therewith by a spline connection 310. Through the connection 310, rotational movement of the cage 296 is imparted to the extension 308. The end of the extension 308 opposite that connected to the cage 296 is connected in driving engagement with a secondary planetary gear train 312 corresponding substantially to that of the FIG. 4 embodiment. For the sake of simplicity, elements of the gear train 312 corresponding to those of the secondary gear train in FIG. 4 will be designated by like numerals followed by the subscript $c$. These elements comprise the following: a secondary sun pinion 196c, coaxially fixed to the extension 308 for rotation therewith; a secondary planet cage assembly 198c coaxially received around the pinion 196c and comprising a cage 200c having a secondary planet pinions 202c rotatably supported therein in engagement with the sun pinion 196c by journals 204c; an oil guide 206c fixedly mounted in the cage 200c coaxially around the pinion 196c; and, a secondary ring gear 208c secured against rotation relative to the housing 268 in mating engagement with the planet pinions 202c. The ring gear 208c is secured for limited rectilinear movement relative to the housing 268 between a spline 314 and an annular shoulder 316 fixed relative to the housing.

The cage 200c drives a driven shaft 58c through an arrangement corresponding substantially to that between the cage 200 and shaft 58a of the FIG. 4 embodiment. Accordingly, for the sake of simplicity, the elements of this arrangement will be designated by numerals corresponding to the arrangement of the FIG. 4 embodiment, followed by the subscript $c$. These elements comprise the following: a collar 216c disposed in coaxial alignment with the cage 200c; a spline connection 218c securing the collar 216c to the cage 200c for rotation therewith; a tapered section 220c on the shaft 58c received within a socket therefor in the collar 216c; and, a nut 222c threadably received on the shaft 58c against the collar 216c to maintain the collar in locked engagement with the shaft 58c. A sleeve bearing assembly 318 is supported on the housing 268 in engagement with the collar 216 to radially support the collar for rotation relative to the housing. Radial support of the collar 216 and the driven shaft 58c is also effected by sleeve bearing assembly 320 mounted on the housing 268 in rotational engagement with shaft. The latter assembly also effects radial support of any element driven by the shaft 58c, such as the impeller element designated by the numeral 322.

Thrust imparted to the driven shaft 58c is transferred therethrough to a Kingsbury shoe assembly support fixture 324 coaxially fixed to the shaft by a nut 326. The fixture 324 has mounted therein for rotation therewith a pair of thrust shoe assemblies 328 engaged with the opposite bearing surfaces of the thrust collar 284. Through the latter arrangement, thrust forces imparted to the shaft 58c are transmitted directly to the collar 284 and, in turn, to the primary thrust bearing assembly 272.

In operation, the FIG. 7 embodiment effects a double gear reduction between the driver shaft 264 and the driven shaft 58c. Where this reduction is greater than two to one, the relative velocity between the thrust collar 284 and the thrust shoe assemblies 328 is greater than that which would occur if one of these components were fixed in conventional manner. Thus, the FIG. 7 embodiment functions to increase the capacity of the thrust bearing on the driven shaft in a manner corresponding substantially to that of the FIG. 4 embodiment.

Lubrication for the bearing surfaces on the collar 284 and thrust shoe assemblies 328 is provided through the gear pump action produced in the oil guide 206c. It is noted that this guide includes an axial port 234c and an annular groove 236c corresponding in structure and operation to the port and groove 234 and 236, respectively, of the FIG. 4 embodiment. The groove 236c is in fluid communication with drilled holes 238c in the extension 308 corresponding to the drilled hole 238 in structure and function. Thus, the oil guide 206c, together with the sun pinion 196c and the planet pinions 202c functions to direct oil under pressure around the shaft 58c and into the portion of the extension 308 surrounding the support fixture 324. The oil reservoir in the FIG. 7 embodiment would be defined by the housing 268 and contain oil to a level above the lowermost extremity of the pinions 202c.

It is to be understood that the lubrication system of the FIG. 7 embodiment may be extended so that oil under pressure from the guide 206c is also channeled to the principal thrust bearing assembly 272. Such an arrangement might be facilitated simply by forming a passage actually through the shaft 264b from the interior of the extension 308 to the interior of the support fixture 274. In this event, suitable return passages for the oil should also be provided to establish fluid communication between the interior of the fixture 274 and the reservoir defined by the housing 268. It is also anticipated that the lubrication system of the FIG. 7 embodiment may effectively employ splash lubrication from the reservoir to the rotating parts desired to be lubricated.

Although not illustrated, it is also to be understood that the vertically disposed embodiments of the invention illustrated in FIGS. 1, 3 and 4 are ideally suited for use in combination with the environmental control illustrated in my aforementioned copending application Ser. No. 570,197. In this case, the control structure would, ideally, be housed in the same housing as the planetary gear train or trains beneath the rotating oil cup fixed to the driven shaft. It should also be appreciated that the invention is not limited to incorporation into a planetary gear train wherein the ring gear is the locked element of the train. Modification of this specific arrangement might be provided by locking one of the other elements of the train and mounting the mating thrust bearing components on the other two elements for rotation therewith. For example, the cage assembly of the gear train might be locked and the bearing components mounted for rotation, respectively, with the sun pinion and ring gear. This particular arrangement would be especially advantageous, since the mating bearing components would rotate in opposite directions and, thus, the velocity differential therebetween would be greatly increased, even for very low gear ratios.

In conclusion, it is noted that the invention is not intended to be limited to the specifics of the details herein illustrated and described, but rather is defined by the following claims.

What is claimed is:
1. In a combination comprising:
 (I) a planetary gear train comprised of the following operatively associated components,
   (1) a sun gear element;
   (2) a planet cage assembly element; and
   (3) a ring gear element;
 (II) a driver shaft connected to one of said elements in coaxial alignment therewith to impart rotation thereto;
 (III) a driven shaft connected to another of said elements in coaxial alignment therewith for rotation thereby; and
 (IV) means locking the remaining element against rotation with respect to the elements connected to said driver and driven shafts;
an improved thrust bearing assembly for said driven shaft, comprising:
 (A) a thrust collar journal;
 (B) a thrust ring journal disposed in coaxially mated relationship with said collar journal for rotation relative thereto;
 (C) means coaxially securing one of said journals to said driver shaft against rotational and rectilinear movement relative thereto and for rotation therewith; and
 (D) means coaxially securing the other of said journals to said driven shaft against rotational and rectilinear movement relative thereto and for rotation therewith whereby said journals both rotate and thrust imparted to one of said shafts is transferred to the other through said journals.

2. In a combination according to claim 1, the improved thrust bearing assembly wherein the thrust ring journal is of the pivoted segmental thrust bearing type and comprises:
(A) a base ring concentrically fixed to the element upon which said journal is mounted; and
(B) a plurality of bearing shoes mounted on said base ring for rocking movement relative thereto, said shoes having bearing surfaces positioned in opposition to said thrust collar through which mated relationship of said thrust ring with said collar is established.

3. In a combination according to claim 1, wherein the axis of the planetary gear train is vertically disposed, the improved thrust bearing assembly further comprising:
(A) a cup concentrically secured to the lowermost of said shafts for rotation therewith, said cup extending upwardly around said shaft to define an annular chamber having an upper peripheral edge;
(B) an oil reservoir disposed, at least partially, within the confines of said cup and fixed against rotation relative to said lowermost shaft, said reservoir being adapted to contain oil therein to a predetermined level beneath the level of the upper peripheral edge of said cup and having passage means therethrough at a level between said edge and predetermined level to establish fluid communication between the interior thereof and the interior of said cup; and
(C) means to communicate oil contained in said cup and reservoir to said collar and ring journals to effect lubrication thereof.

4. In a combination according to claim 3, the improved thrust bearing assembly wherein the means to communicate oil to said collar and ring journals comprises:
(A) a gear pump disposed within said cup and operatively associated with said lowermost shaft for driving thereby, said gear pump having an inlet in fluid communication with said reservoir; and
(B) conduit means connected in fluid communication with the outlet of said gear pump to direct oil discharged therefrom over said collar and ring journals.

5. In a combination according to claim 1, the improved thrust bearing assembly wherein:
(A) the collar journal is the journal mounted on the driver shaft for rotation therewith; and
(B) the ring journal is the journal mounted on the driven shaft for rotation therewith.

6. In a combination according to claim 1, the improved thrust bearing assembly wherein:
(A) the ring journal is the journal mounted on the driver shaft for rotation therewith; and
(B) the collar journal is the journal mounted on the driven shaft for rotation therewith.

7. In a combination according to claim 1, the improved thrust bearing assembly further comprising:
(A) a housing confining said planetary gear train, said housing supporting against rotational movement relative thereto the means locking said remaining element against rotation; and
(B) a thrust bearing mounted on said housing and operatively associated with said driver shaft to effect rotatable support thereof on said housing.

8. In a combination comprising:
(I) a planetary transmission comprised of a plurality of planetary gear trains, said trains each comprising the following operatively associated components:
(1) a sun gear element;
(2) a planet cage assembly element; and
(3) a ring gear element;
(II) means coaxially coupling said trains in an operatively associated series to define a composite train wherein rotation imparted to one of said gear trains is transmitted to the others;
(III) means locking one of the elements in each of the gear trains against rotation relative to the other elements therein;
(IV) a driver shaft connected in coaxial alignment with one of the rotatable elements of the gear train at one end of said composite train to impart rotation thereto; and
(V) a driven shaft connected in coaxial alignment with one of the rotatable elements of the gear train at the other end of said composite train for rotation thereby;
an improved thrust bearing assembly for said driven shaft, comprising:
(A) a thrust collar journal;
(B) a thrust ring journal disposed in coaxially mated relationship with said collar journal for rotation relative thereto;
(C) means coaxially securing one of said journals to said driven shaft against rotational and rectilinear movement relative thereto and for rotation therewith; and
(D) means coaxially securing the other of said journals to a rotatable element of one of said gear trains removed from the gear train including the element to which said driven shaft is connected, said means securing said journal against rotational and rectilinear movement relative to said rotatable element and for rotation therewith whereby said journals both rotate and thrust imparted to one of said shafts is transferred to the other through said journals.

9. In a combination according to claim 8, the improved thrust bearing assembly wherein the thrust ring journal is of the pivoted segmental thrust bearing type and comprises:
(A) a base ring concentrically fixed to the element upon which said journal is mounted; and
(B) a plurality of bearing shoes mounted on said base ring for rocking movement relative thereto, said shoes having bearing surfaces positioned in opposition to said thrust collar through which mated relationship of said thrust ring with said collar is established.

10. In a combination according to claim 8, wherein the axes of the planetary gear trains are vertically disposed, the improved thrust bearing assembly further comprising:
(A) a cup concentrically secured to the lowermost of said shafts for rotation therewith, said cup extending upwardly around said shaft to define an annular chamber having an upper peripheral edge;
(B) an oil reservoir disposed, at least partially, within the confines of said cup and fixed against rotation relative to said lowermost shaft, said reservoir being adapted to contain oil therein to a predetermined level beneath the level of the upper peripheral edge of said cup and having passage means therethrough at a level between said edge and predetermined level to establish fluid communication between the interior thereof and the interior of said cup; and
(C) means to communicate oil contained in said cup and reservoir to said collar and ring journals to effect lubrication thereof.

11. In a combination according to claim 10, the improved thrust bearing assembly wherein:
(A) said predetermined level is above the planetary gear train having a rotatable element connected to said lowermost shaft, whereby said gear train is submerged in oil contained in said reservoir; and
(B) the means to communicate oil to said collar and ring journals comprises:
(1) a housing partially confining said gear train to define therewith a gear pump having an inlet and an outlet, said inlet being in fluid communication with said reservoir beneath said predetermined level; and (2) conduit means connected in fluid communication with the outlet of said gear pump to direct oil discharged therefrom to said collar and ring journals.

12. In a combination according to claim 8, the improved thrust bearing assembly further comprising:

(A) a housing confining said planetary gear trains, said housing supporting against rotational movement relative thereto the means locking one of the elements in each of said gear trains against rotation relative to the other elements therein; and (B) a thrust bearing mounted on said housing and operatively associated with the element secured to the other of said journals to effect rotatable support of said element on said housing.

References Cited

UNITED STATES PATENTS

| | | | |
|---|---|---|---|
| 1,992,248 | 2/1935 | Smyser | 308—134.1 |
| 2,505,002 | 4/1950 | Orr | 74—801 |
| 3,245,733 | 4/1966 | Summers | 308—160 |

HOUSTON S. BELL, JR., *Primary Examiner.*

U.S. Cl. X.R.

308—160; 74—801